US009729577B2

(12) United States Patent
White et al.

(10) Patent No.: US 9,729,577 B2
(45) Date of Patent: Aug. 8, 2017

(54) SYSTEM AND METHOD FOR ENCRYPTION KEY MANAGEMENT, FEDERATION AND DISTRIBUTION

(71) Applicant: FORNETIX LLC, Leesburg, VA (US)

(72) Inventors: Charles White, Charles Town, WV (US); Joseph Brand, Charles Town, WV (US); Stephen Edwards, Shepherdstown, WV (US)

(73) Assignee: Fornetix LLC, Leesburg, VA (US)

( * ) Notice: Subject to any disclaimer, the term of this patent is extended or adjusted under 35 U.S.C. 154(b) by 0 days.

(21) Appl. No.: 14/506,346

(22) Filed: Oct. 3, 2014

(65) Prior Publication Data

US 2015/0101012 A1   Apr. 9, 2015

Related U.S. Application Data

(60) Provisional application No. 61/887,662, filed on Oct. 7, 2013, provisional application No. 61/950,362, filed on Mar. 10, 2014.

(51) Int. Cl.
*H04L 29/06* (2006.01)
*G06F 17/30* (2006.01)

(52) U.S. Cl.
CPC ........ *H04L 63/20* (2013.01); *G06F 17/30424* (2013.01); *H04L 63/062* (2013.01)

(58) Field of Classification Search
CPC .. G06F 17/30424; H04L 63/20; H04L 63/062
USPC .......................................................... 726/1
See application file for complete search history.

(56) References Cited

U.S. PATENT DOCUMENTS

| | | | |
|---|---|---|---|
| 8,213,620 B1* | 7/2012 | Sussland | H04L 9/083 380/278 |
| 2004/0151308 A1* | 8/2004 | Kacker | H04L 63/0442 380/30 |
| 2009/0092252 A1 | 4/2009 | Noll et al. | |
| 2009/0175452 A1 | 7/2009 | Gelfond et al. | |
| 2012/0204032 A1 | 8/2012 | Wilkins et al. | |
| 2013/0044878 A1 | 2/2013 | Rich et al. | |

(Continued)

OTHER PUBLICATIONS

International Preliminary Report on Patentability Opinion dated Apr. 21, 2016, from related PCT application No. PCT/US2014/059187.

(Continued)

*Primary Examiner* — Kambiz Zand
*Assistant Examiner* — Aubrey Wyszynski
(74) *Attorney, Agent, or Firm* — Foley & Lardner LLP

(57) ABSTRACT

Systems and methods are described for orchestrating a security object, including, for example, defining and storing a plurality of policies in a database coupled to a policy engine and receiving, by the policy engine, the security object and at least one object attribute associated with the security object. In addition, the policy engine determines the acceptability of the security object based, at least in part, on the at least one object attribute and at least one of the plurality of policies corresponding to the at least one object attribute. The security object to at least one communication device associated with the policy engine is distributed when the security object is determined to be acceptable. The at least one communication device establishes communication based, at least in part, on the security object.

22 Claims, 9 Drawing Sheets

(56) References Cited

U.S. PATENT DOCUMENTS

2013/0044882 A1    2/2013   Rich et al.
2013/0114812 A1    5/2013   Gidwani

OTHER PUBLICATIONS

Extended European Search Report dated Feb. 28, 2017, from related application No. 14852759.1.

* cited by examiner

SYSTEM AND METHOD FOR ENCRYPTION KEY MANAGEMENT, FEDERATION AND DISTRIBUTION

CROSS-REFERENCE TO RELATED PATENT APPLICATIONS

This application claims priority from Provisional Application No. 61/887,662, filed Oct. 7, 2013, and Provisional Application No. 61/950,362 filed Mar. 10, 2014, incorporated herein by reference in their entirety.

BACKGROUND OF THE INVENTION

1. Field of the Invention

Embodiments of the present invention relate generally to security objects used in communication systems and, more specifically, to generation, management, distribution, federation, and/or orchestration of security objects.

2. Background

In security systems, an encryption key refers to a parameter or data that dictates how plain data may be translated into encrypted data during an encryption process and encrypted data into plain data during a decryption process. Typically, the encryption key is made available both of a source device (e.g., a transmitting device) and a target device (e.g., a receiving device) in a communication transaction. Given that encryption keys are used pervasively, effective management of the encryption keys (as well as other security objects) to defend and respond to threats against the security systems is of paramount importance.

Traditionally, encryption key management is initiated and executed at the device level (e.g., by the source device and/or the target device that are involved in the communication transaction). Communication management, on the other hand, is traditionally centrally managed at a higher level (e.g., by a server for the source device and target device). The end result may be that the encryption management is procedurally unsynchronized with communications management. Thus, loose controls of encryption keys, as demonstrated in current public key infrastructure (PKI) instances, may result. In addition, loose controls of symmetric keys generated and distributed in an enterprise may also occur. Accordingly, an end result may be a breakdown in communication management or communication security. Similar problems confront other types of encryption objects.

SUMMARY OF THE DISCLOSURE

The current disclosure describes embodiments relating to security object orchestration, including, but not limited to, management, distribution, and federation of security objects. Security objects may include, but not limited to, encryption keys and other security objects (such as, but not limited to, user identity information, certificates, biometric data, random number generator data, determinate random number generator data, non-determinate random number generator data, user authentication information, policy components, other components associated with organization security component, and/or the like).

A process for orchestrating a security object, the process includes, but is not limited to, defining and storing a plurality of policies in a database coupled to a policy engine, receiving, by the policy engine, the security object and at least one object attribute associated with the security object, determining, with the policy engine, the acceptability of the security object based, at least in part, on the at least one object attribute and at least one of the plurality of policies corresponding to the at least one object attribute, and distributing the security object to at least one communication device associated with the policy engine when the security object is determined to be acceptable. The at least one communication device establishes communication based, at least in part, on the security object.

In some embodiments, the security object is an encryption key. In various embodiments, the at least one object attribute comprise characteristics of at least one of the security object, a first device generating the security object, a second device transmitting the security object, a third device receiving the security object, a first user associated with the first device, a second user associated with the second device, and a third user associated with the third device.

According to some embodiments, the at least one object attribute comprises at least one of a security object size, time when the security object is generated, geo-location where the security object is generated, classification of the security object, role associated with a key source, role associated with a source device, and role associated with a target device.

In some embodiments, the plurality of policies comprises accepting the security object when the security object size is within a predetermined size range. In various embodiments, the plurality of policies comprises accepting the security object when the time when the security object is generated is within a predetermined time interval.

In some embodiments, the plurality of policies comprises accepting the security object when the geo-location where the security object is generated is within a predetermined area. As implemented in some embodiments, the plurality of policies comprises accepting the security object when the classification of the security object is associated with a predetermined security object classification group. In some embodiments, the plurality of policies comprises accepting the security object when the role associated with the key source, the source device, or the target device is associated with a predetermined group of roles.

The process further includes transmitting a rejection indicator to a key source; and transmitting a hint informing inadequacies of the security object to the key source, wherein the security object is received from the key source.

In some embodiments, the receiving, by the policy engine, the security object includes receiving, by the policy engine, a request to generate the security object and generating, by the policy engine, the security object.

As implemented according to various embodiments, a process for orchestrating a security object includes, but not limited to defining and storing a first plurality of policies in a first database of a first key orchestration device. The first database being associated with a first enterprise. The process further includes receiving, with the first key orchestration device associated with the first enterprise. The security object and at least one object attribute associated with the security object from a second key orchestration device associated with a second enterprise. In addition, the process may include determining, with the first key orchestration device, the acceptability of the security object based, at least in part, on the at least one object attribute and at least one of the first plurality of policies corresponding to the at least one object attribute and distributing the security object to a first communication device associated with the first enterprise.

As described in some embodiments, the process further includes defining and storing a second plurality of policies in a second database of the second key orchestration device.

At least a first portion of the first plurality of policies and a second portion the second plurality of policies is the same.

In some embodiments, the process further includes transmitting, from the first key orchestration device to the second key orchestration device, the security object and distributing the security object to a second communication device associated with the second enterprise, wherein the first communication device and the second communication device may establish communication based on the security object.

In various embodiments, the process further includes transmitting, from the first key orchestration device to the second key orchestration device, the security object, determining, with the second key orchestration device, the acceptability of the security object based, at least in part, on the at least one object attribute and at least one of the second plurality of policies corresponding to the at least one object attribute, and distributing the security object to a second communication device associated with the second enterprise. The first communication device and the second communication device may establish communication based on the security object.

As implemented in various embodiments, the receiving the security object and at least one object attribute associated with the security object from a second key orchestration device includes receiving, by the first key orchestration device from the second key orchestration device, a request to generate the security object and generating, with a key source associated with the first enterprise, the security object in response to the request.

In some embodiments, a computer-readable medium comprising computer-readable instructions such that, when executed, causes a processor to define a plurality of policies in a database, receive the security object and at least one object attribute associated with the security object, determine the acceptability of the security object based, at least in part, on the at least one object attribute and at least one of the plurality of policies corresponding to the at least one object attribute; and distribute the security object to at least one communication device associated with the processor when the security object is determined to be acceptable. The at least one communication device establishes communication based, at least in part, on the security object. In some embodiments, the security object is an encryption key.

In various embodiments, the at least one object attribute comprises at least one of a security object size, time when the security object is generated, geo-location where the security object is generated, classification of the security object, role associated with a key source, role associated with a source device, and role associated with a target device.

As implemented in some embodiments, the plurality of policies comprises accepting the security object when at least one of the security object size is within a predetermined size range, the time when the security object is generated is within a predetermined time interval, the geo-location where the security object is generated is within a predetermined area, the classification of the security object is included in a predetermined security object classification group, and the role associated with the key source, the source device, or the target device is associated with a predetermined group of roles.

DETAILED DESCRIPTION

Figure 1:
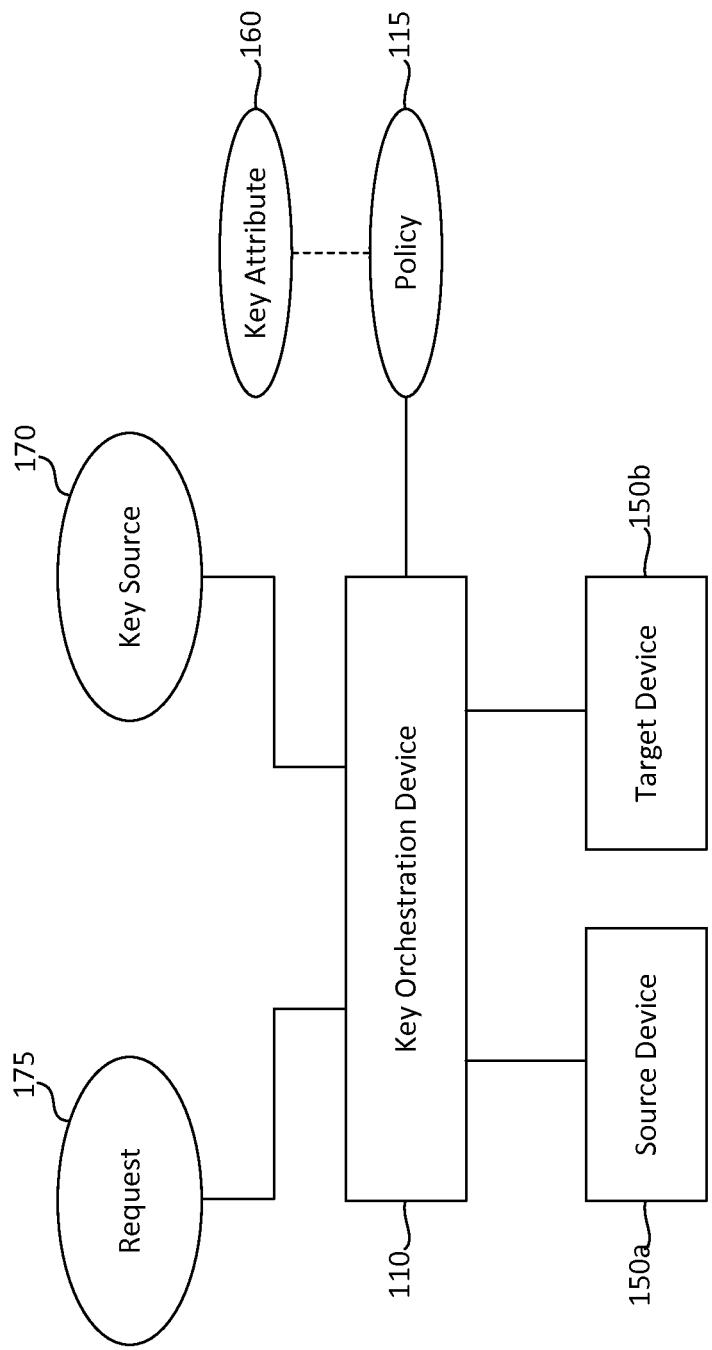
FIG. 1 is a schematic block diagram illustrating an example of a general encryption key orchestration system according to various embodiments.

In the following description of various embodiments, reference is made to the accompanying drawings which form a part hereof and in which are shown by way of illustration specific embodiments in which the invention may be practiced. It is to be understood that other embodiments may be utilized, and structural changes may be made without departing from the scope of the various embodiments disclosed in the present disclosure.

Embodiments described herein generally relate to security object orchestration. The security object orchestration may include management, distribution, and federation of the security object. Security objects may include encryption keys and other sensitive objects (such as, but not limited to, user identity information, certificates, biometric data, random number generator data, determinate random number generator data, non-determinate random number generator data, user authentication information, policy components, other components associated with organization security component, and/or the like). In the present disclosure, encryption key-based orchestration is described in various embodiments as examples of the security object orchestration systems and methods. It should be appreciated that the orchestration systems and methods are likewise applicable to other security objects, including those described above.

As used herein, "key orchestration" may refer to a combination of key management, key federation, and key distribution activities in one or more enterprises. For example, embodiments described may be associated with the orchestration of encryption key information correlated with utilizing encryption in the one or more enterprises. "Enterprise key management" may include managing and/or overseeing the multiple uses of asymmetric and symmetric keys required for encrypting data, signing emails, authenticating web services, and/or other potential uses. This may also include encryption management for communications systems to include radio, cellular, satellite and internet protocol based communications. "Enterprise key federation" may include coordinating and negotiating the federation of key information to a plurality of disparate key orchestration platforms (each associated with disparate federating organizations) based on established trust between the federating organizations (e.g., the enterprises). "Key distribution" may refer to a centralized distribution (e.g., pushing or forwarding) of key material to support encryption operations within a local enterprise and/or a foreign enterprise. In particular, key distribution may be concerned with assigning or otherwise transmitting the appropriate encryption keys to an appropriately associated device (e.g., the communication device, which may either be a source device or a target device).

Embodiments of key orchestration (e.g., a key orchestration device such as a management request handler coupled to a request handler and various supporting databases) may provide control of encryption key management, federation, and distribution through a centralized user interface. Such key orchestration devices may provide centralized systems and/or methods of managing encryption keys associated with communications, infrastructure, and applications. Such key orchestration devices may also manage device enrollment, monitor device health related to encryption capabilities, and monitor status for key orchestration activities. Such capabilities may allow robust transaction reporting to support audit activities associated with communications, application, and infrastructure management.

Key orchestration may be leveraged for additional systems other than the communication systems. Other implementations of key orchestration may include application encryption management, virtualization encryption management, storage encryption management, and/or user identity encryption management. In short, if applications, communications, or infrastructures require use of encryption (or other types of security mechanisms using security objects) and keys (or security objects), orchestration may be applied to provide advantages as described. Communication systems may include, but are not limited to, radio communications, cellular communications, transmission control protocol/internet protocol (TCP/IP) based communications, satellite communications equipment, and the like. Application systems may include, but are not limited to voice-over-internet protocol VoIP applications, virtualization, identification and authentication, messaging, local storage. Infrastructure systems may include, but are not limited to storage solutions, physical security infrastructure, and medical equipment.

In particular embodiments, a key orchestration device may enable encryption key lifecycle activities across multiple types of communication devices in a centralized manner. The key orchestration device may leverage industry standards for key management for interoperability with existing systems and may use, for example, protocols for applied key management as a part of key orchestration. A distinction between applied key orchestration and key management alone may be demonstrated in encryption key management and key distribution for communication systems. Given the requirement to make new encryption connections before breaking existing connections, typical communication systems cannot utilize rekey commands as it would break communications before management steps are taken to establish new lines of communications. However, rekey commands may work for infrastructure—to include storage, applications and virtualization solutions—where services can be reestablished without loss of centralized control of the managed capability.

The system architecture of key orchestration can be configured to allow for use of a standard-based approach for supported systems such as key management interoperability protocol (KMIP), for example, but also the capability to develop support interfaces for non-standardized systems such as physical security infrastructure, virtualization applications, satellite communications systems, and medical equipment. This may be accomplished by architecturally separating message handling from support interfaces. Using a purely KMIP example, a storage device may receive a "rekey" command, a communication equipment may receive "put-and-notify" commands, and cellular devices may request queued "notify" commands informing the cellular devices to send "get messages" to the key orchestration device to be relayed to key management and generation system components. Example systems implementing such features are discussed below.

Embodiments described herein may include a key orchestration device to implement centralized, top-down enterprise encryption key management encryption keys (e.g., such as, but not limited to symmetric key encryption, asymmetric key encryption, and the like) as well as other security objects used in security systems. Such centralized, top-down control of encryption may be for a given enterprise. Embodiments may include implementing coordinated KMIP on enterprise key management, communications systems, applications, and infrastructure for encryption key lifecycle functions implementing at least one of: device registration, user registration, system and user initialization, key material installation, key establishment, key registration, operational use, key storage, key distribution, key update, key recovery, key de-registration, key destruction, key revocation, and the like.

As referred to herein, a "key attribute" (attribute, encryption attribute, and/or the like) associated with an encryption key may refer to a characteristic associated with the encryption key, cryptographic or security characteristics of the encryption key, the cryptographic algorithms of the encryption key, a device generating/transmitting/receiving the encryption key, a user of the device, and/or the like. Each encryption key may be associated with at least one key attribute. The encryption key may be transmitted and/or received with its associated key attributes represented in data values.

As referred to herein, a "policy" may be a rule managing an encryption key based on key attribute(s) associated with that encryption key. In particular embodiments, a policy may dictate whether the particular encryption key is an acceptable encryption key. Such acceptability may be based on the security and cryptographic considerations as to whether the encryption key (e.g., as shown from the key attributes associated with the encryption key) may be secure enough. In other words, the encryption key generated for a particular communication transaction may be presented for inspection by the policy to be evaluated as to whether the encryption key is to be allowed or denied for that communication transaction.

Some embodiments include an interface for key orchestration for mobile communication devices (e.g., a wireless device, and/or the like), or provide an interface for key orchestration for radio/satellite communications systems to include telemetry and payload in satellite communications. Particular implementations of the embodiments may include interfaces for banking applications such as, but not limited to, automated teller machines (ATMs), bank account interfaces, and the like. The interfaces for banking applications may be implemented on any mobile or non-mobile devices. Embodiments may provide an interface for key orchestration for applications that include virtualization or providing an interface for key orchestration for network infrastructure to include routers, switches, virtual private network (VPN)

appliances, firewalls, intrusion detection systems (IDSs), intrusion prevention system (IPSs), tokenizers, and/or the like.

For example, a centralized encryption management may be provided for symmetric encryption keys or asymmetric encryption keys, in both private and/or public contexts. In some embodiments, existing network infrastructure information may be consumed to distribute encryption keys based on active/inactive status of network infrastructure or distributing and managing encryption keys for network infrastructure based on equipment that can readily accept encryption keys (e.g., existing hardware/software may be installed on the equipment for accepting encryption keys).

Embodiments may queue encryption key transaction information for communication devices not available at the point of a given encryption management operation (e.g., in a push-key event). In addition, embodiments described herein may centrally display encryption key lifecycle information (for supported infrastructure) and successful encryption key management transactions. In addition to or as an alternative, failure message and/or a cause of unsuccessful encryption key management transactions may be displayed.

In some embodiments, a service interface for a communication device to acquire new asymmetric keys on a timed basis may be provided. In addition, a service interface for a communication device to acquire new symmetric keys on a timed basis may be provided. In some embodiments, a service interface for a communication device to acquire new asymmetric keys on user initiated basis may be provided. In various embodiments, a service interface for a communication device to acquire new symmetric keys on a user initiated basis may be provided. Also, federated distribution of encryption keys based on established trust based key exchange between two or more key management and orchestration devices may be provided as described.

In some embodiments, distributing federated symmetric key to local enterprise infrastructure based on configurations for federated symmetric key distribution may be provided. In various embodiments, distributing federated asymmetric key to local enterprise infrastructure based on configurations for federated asymmetric key distribution may be provided. In addition, implementing federated trust model by using multiple devices and split key distribution may be provided to establish trust between two untrusted entities that need to communicate securely.

The key orchestration device (e.g., the management request handler and associated components) may include sub-modules including a business logic module, authentication and authorization module, policy enforcement module, system consistency/validation module, and/or the like for performing functions described herein.

FIG. 1 is a schematic diagram of an example of a general encryption key orchestration system 100 as implemented in various embodiments. In various embodiments, a key orchestration device 110 may be coupled to at least one source device 150a and at least one target device 150b. The key orchestration device 110 may comprise at least one desktop computer, mainframe computer, laptop computer, pad device, smart phone device or the like, configured with hardware and software to perform operations described herein. For example, the key orchestration device 110 may comprise computation systems having suitable processing capabilities, memory, user interface (e.g., display and input) capabilities, and communication capabilities configured with suitable software to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the key orchestration device 110 may relate to systems and processes that are implemented with dedicated device hardware/devices specifically configured for performing operations described herein.

Generally, the source device 150a may be a communication device transmitting data (or initiating communication) for which encryption (and therefore an encryption key) may be required or preferred. The target device 150b may be a communication device for receiving data that may have been encrypted (e.g., with an encryption key). According to various embodiments, the source device 150a and/or the target device 150b may be an ATM. The source device 150a and/or the target device 150b may also be any server or device for storing bank account information and executing banking functions. In particular embodiments, each of the source device 150a and the target device 150b may include a mobile smart phone (such as, but not limited to an iPhone™, an Android™ phone, or the like) or other wireless mobile communication devices with suitable processing and encryption capabilities. Typical modern mobile communication devices include telephone communication electronics as well as some processor electronics, one or more display devices and a keypad and/or other user input device. In further embodiments, each of the source device 150a and the target device 150b may comprise any suitable type of mobile phone and/or other type of portable electronic communication device, such as, but not limited to, an electronic smart pad device (such as, but not limited to an iPad™), a portable computer, or the like. It should be noted that an encryption key may originate from either the source device 150a or the target device 150b, and/or both. In other words, either of the source device 150a or the target device 150b may be a key source 170. The source device 150a and the target device 150b may be associated with a same enterprise or separate enterprises. In other embodiments, one or both of the source device 150a and the target device 150b may be a wired device suitable for communication with a wired or wireless device.

In some embodiments, the key orchestration device 110 may be a part of the enterprise associated with the source device 150a and target device 150b. An enterprise may be an organization or security unit having dominance over at least one source device 150a and/or target device 150b. With respect to communication between the source device 150a and the target device 150b associated with disparate enterprises, the source device 150a may be associated with a first enterprise and the target device 150b may be associated with a second disparate enterprise. An enterprise may be a company, subgroup within a company, autonomous and independent entity, a communication group, security provider, various entities, organizations, and/or the like. Each key orchestration device 110 may perform key orchestration activities for a plurality of devices such as the source device 150a and the target devices 150b, establishing a hierarchical model for key orchestration.

In other embodiments, the key orchestration device 110 may be a third party server coupled to the enterprise associated with the source device 150a and/or target device 150b. Thus, various embodiments may affect centralization of encryption key orchestration with existing communication systems and protocols of the enterprise. In other words, the key orchestration device 110 may be implemented to cooperate with the existing encryption technology for communications, applications, and infrastructure. Key orchestration (e.g., by a third party or otherwise) may interact with both the sources and targets of key information (e.g., the encryption key and the associated key attributes 160). Accordingly, a top-down control of key orchestration may be achieved, while maintaining a request model in which the source device 150a and the target device 150b may request key information.

In some embodiments, a key source 170 may be coupled to the key orchestration device 110. The key source 170 may be any source by which an encryption key (or any other types of security objects) may be generated. In some embodiments, the key source 170 may be a part of the key orchestration device 110 (e.g., a module or database within the key orchestration device 110 or coupled to the key orchestration device 110). In other embodiments, the key source 170 may be a source external to the key orchestration device 110. The key source 170 may include the source device 150a and/or the target device 150b, one or more of which may be capable of generating encryption keys for the communication therebetween. Alternatively or additionally, the key source 170 may be a key-generating device (other than the source device 150a and the target device 150b) internal or external to the same enterprise as the source device 150a and/or the target device 150b. In these cases, the key source 170 may be an existing specialized key generating device implemented separately from the key orchestration device 110 (e.g., the key generation and management device 230 of FIG. 2). Other examples of the key source 170 may include a management user interface 220 of FIG. 2 (e.g., encryption keys may be generated manually through the management user interface 220), a key federation interface 260 of FIG. 2 (e.g., encryption keys generated from a disparate enterprise), various databases storing generated encryption keys, and/or the like.

In various embodiments, a request 175 may be sent to the key orchestration device 110. The request 175 may be a request to generate an encryption key. For example, the key orchestration device 110 may itself generate (or retrieve from a database coupled to the key orchestration device 110) encryption keys in response to the request 175. In other examples, the key orchestration device 110 may request an encryption key from other devices (e.g., the key source 170) within the same or a disparate enterprise.

The request 175 may originate from the source device 150a, the target device 150b, the key orchestration device itself 110, a third-party device within the same enterprise (e.g., the management user interface 220, the key management interface 240, and the like), a third-party device in a disparate enterprise (e.g., from the key federation interface 260 of FIG. 2), and/or the like. Embodiments of the key orchestration device 110 may therefore serve as an intermediary device between the source device 150a, the target device 150b, the requesting device (which issues the request 175), the key source 170, and/or the like. Accordingly, key management, distribution, and federation may effectively be managed for various devices in a same or disparate enterprise.

Various components within the general encryption key orchestration system 100 (e.g., the key orchestration device 110, the source device 150a, the target device 150b, the key orchestration device itself 110, the device that issues the request 175, the key source 170, and/or the like) may be connected via any suitable wired or wireless network. The network may be secured or unsecured. For example, the network may be a wide area communication network, such as, but not limited to, the internet, or one or more intranets, local area networks (LANs), ethernet networks, metropolitan area networks (MANs), a wide area network (WAN), combinations thereof, or the like. In particular embodiments, the network may represent one or more secure networks configured with suitable security features, such as, but not limited to firewalls, encryption, or other software or hardware configurations that inhibits access to network communications by unauthorized personnel or entities.

In some embodiments, key attributes 160 may refer generally to characteristics associated with the encryption key itself, characteristics of a device associated with the encryption key, and/or the like. In other words, the key attributes 160 may refer to when, where, how, for what, with what device the encryption key has been or is about to be generated. Examples of the key attributes 160 may include, but not limited to, encryption key size, a classification of the encryption key, a time at which the encryption key has been or about to be generated (e.g., by the key source 170), a location in which the encryption key has been or about to be generated (e.g., by the key source 170), a role associated with the key source 170, a role associated with the source device 150a, a role associated with the target device 150b, a role associated with a key generating/storage device, a role associated with a user of the source device 150a, the target device 150b, the key generating/storage device, the source 170, a combination thereof, and/or the like.

In some embodiments, the key attributes 160 may include the key size. Typically, the larger the key size (i.e., the longer the encryption key), the more security it may provide for the communication. The key attributes 160 may also include the classification of the encryption key. In various embodiments, the classification of the encryption key may refer to its utilization e.g., what the encryption key may be used for. Examples of the utilization may include (e.g., for communication systems) whether an encryption key is a global hopping key, whether the encryption key is a secret key, whether the encryption key is symmetrical or asymmetrical, a combination thereof, and/or the like.

In some embodiments, the key attributes 160 may include a time and/or location at which the encryption key has been or about to be generated. As described, the time and/or location at which the encryption key may be generated may be defined from the perspective of the source device 150a, the target device 150b, and/or any other key sources 170. For example, when an encryption key is generated (and/or sent, received), a corresponding time of the device (e.g., the key sources 170) generating (and/or sending, receiving) the encryption key may be determined. The encryption key may be transmitted/stored with a time stamp representing the time. Similarly, when an encryption key is generated (and/or sent, received), a corresponding geo-location of the device (e.g., the key sources 170) generating (and/or sending, receiving) the encryption key may be determined. The encryption key may be transmitted/stored with the geo-location.

In various embodiments, the key attributes 160 may include role(s) associated the source device 150a, the target device 150b, the key source 170, the other key generating/storage device, as well as their associated user. Particularly, a role may refer to a group/classification (e.g., based on predefined assignment, time, geo-location of the device, whether the device is generating encryption keys, whether the device is transmitting the encryption key, whether the device is receiving the encryption keys, and/or the like) in which the device/user is assigned to, a level of security clearance, the type of the device/user, a combination thereof, and/or the like. In particular examples, each device/user may be associated with at least a security group (e.g., assigned to a server). Within each security group, subgroups may be exist to further subdivide the devices/users. The groups/subgroups may be predetermined by any suitable personnel. In other or further embodiments, the groups/subgroups may be defined when the encryption key is generated (e.g., based on current characteristics of the device such as geo-location, time of the day, and/or the like).

It should be appreciated by one of ordinary skill in the art that one or more key attributes 160 may be associated with a given encryption key. In fact, as implemented in various embodiments, an encryption key may be associated with a plurality of key attributes 160. The encryption key may be transmitted along with the associated key attributes 160 to a device (e.g., the key orchestration device 110). The encryption key and the key attributes 160 associated with the encryption key may be inspected according to at least one policy related to the key attributes 160. Such process may be referred to as "shooting" the key attributes 160 against the relevant policies or "presenting" the key attributes 160 for "inspection" by the policy.

The encryption keys may generally be managed by a set of policies 115. As implemented in various embodiments, a policy may refer to at least one defined rules governing the criteria for the key attributes 160. In some embodiments, a policy engine (e.g., as embedded in the key orchestration device 110 and/or other devices as described herein) may receive the encryption key and the key attributes 160 associated with the encryption key as input. The policy engine may output a response as to whether the encryption key may be allowable based on the key attributes 160. In particular embodiments, the policy engine may output a binary response (e.g., accepted or denied).

The encryption key and the associated key attributes 160 may be presented for inspection one or more times per communication transaction. In some embodiments, the encryption key and the associated key attributes 160 may only be required to be presented for inspection by policy 115 once per communication transaction (e.g., at the initiation stage before the communication transaction has taken place but after the encryption key has been generated). In other or further embodiments, the encryption key and the associated key attributes 160 may be required to be presented for inspection by the policies 115 periodically and/or every time the encryption key has been altered for a given communication transaction. In some case several encryption keys may be presented for inspection by the policies 115 for a given communication transaction.

The policy engine may identify the key attributes 160 received. The policy engine may retrieve relevant policy 115 from a local or remote storage database. In other embodiments, the policy engine may inspect particular key attributes 160 (or sometimes all key attributes 160) associated with the encryption key as the policy engine determines acceptability based on the predefined set of policies 115. For example, the policy engine may determine, based on the relevant policy 115, whether the encryption key should be accepted for the communication transaction for which the encryption key may be generated.

In one non-limiting example, the policies 115 may dictate that a size of the encryption key must be within a predetermined range (e.g., the size of the encryption key must exceed and/or be below 128 bits, 192 bits, 256 bits, and/or the like). In some cases, the policy 115 may dictate that the size of the encryption keys must be a particular key size (e.g., 256-bit, and/or the like).

The policies 115 may require that the geo-location attribute of the key attributes 160 to be associated with (or not associated with) a predetermined location and/or within (or not within) a predetermined area. For example, when the geo-location attribute of the encryption key (e.g., as defined by the geo-location of the generating, transmitting, and/or receiving device of the encryption key) is associated with a "danger" zone, the policy engine may deny the encryption key. This is because there may be a high likelihood that the encryption key may be compromised in the danger zone. On the other hand, when the geo-location attribute of the encryption key is associated with a "safe" zone, then the encryption key may be allowed for the communication transaction. This is because there may be at most a low likelihood of comprised security keys. In further embodiments, a "neutral" zone may be a safe zone, or, in the alternative, a zone associated with an intermediate likelihood of comprised security keys.

In another non-limiting example, the policies 115 may require the time attribute of the key attributes 160 to be within (or not within) a predetermined time period. The policy 115 may deny the encryption key on the basis that the time attribute (e.g., a time stamp) associated with the creation, transmission, and/or reception of the encryption key may be outside of a predetermined time period (for example, at 3:00 am, where acceptable creation, transmission, and/or reception time of the encryption key may be between 9:00 am-5:00 pm).

In various embodiments, the policies 115 may allow the encryption key, when the role attribute of the key attributes 160 is associated with the encryption key generating/transmitting/receiving device (and the device's associated user) is within a predetermined accepted group. In some examples, the source device 150a (the target device 150b or other source devices 170) associated with a first security group within an enterprise may generate an encryption key and present the encryption key for inspection by the policy 115. The policy engine may determine whether the first security group may be a part of the accepted group. When the policy engine determined that the source device 150a (the target device 150b or other source devices 170) is a part of the accepted group (e.g., the first security group falls within the accepted group), the encryption key may be allowed for the communication transaction for which the encryption has been created for.

It should be appreciated by one of ordinary skill in the art that a plurality of policies 115 may act in concert for a comprehensive encryption key management scheme. This means that, the plurality of policies 115, each of which may regulate at least one disparate key attribute 160, may be aggregated into a set of policies 115 for regulating encryption keys presented to the policy engine.

In other examples, other key sources 170 (e.g., other than the source device 150a and the target device 150b) may generate an encryption key to be distributed (or pushed) to the source device 150a and/or the target device 150b for a communication transaction between those devices. The policy engine (e.g., the key orchestration device 110) may inspect the key attributes 160 to determine whether the encryption key is allowable. In response to the encryption key being determined to be allowable, the key orchestration device 110 may determine to distribute the encryption key to the source device 150a and/or the target device 150b for the communication transaction.

In various embodiments, when the policy engine denies the encryption key, the policy engine may transmit a rejection indicator (e.g., a "denied" message) to the key source

170. The key generating device may redesign a second encryption key to be presented (along with the key attributes 160 associated with the second encryption key) to the policy engine for a second round of inspection. In other embodiments, when the policy engine denies the encryption key, the policy engine may transmit a "denied" message to the key source 170 along with a cause of failure (e.g., a hint) as to which the key attribute 160 caused the denial and/or what it should be.

For example, an encryption key with key attributes 160 including a time attribute of 4:49 am, geo-location attribute of "safe zone," and role attribute of "security group A" may be presented to a set of policies 115. The policy engine may allow the encryption key when the encryption key is generated between 5:00 a.m.-9:00 p.m., in either a "safe zone" or a "neutral zone," and for security groups A-C. Such encryption key may be denied, given that it is not generated between 5:00 a.m.-9:00 p.m. The policy engine my transmit the "denied" message along with a time attribute hint (e.g., to generate the encryption key after 5:00 a.m., in 11 minutes).

Accordingly, the key orchestration device 110 may be configured to manage encryption keys and distribute the encryption keys. In other words, the key orchestration device 110 may serve as an intermediary between the source devices 150a, the target devices 150b, other key sources 170, and/or the like as these devices themselves may lack the capability to distribute and manage encryptions in the manner set forth with respect to the key orchestration device 110. The key orchestration device 110 may include a plurality of modules (or may be coupled to remote modules) for each feature as described herein. In addition, the general encryption key orchestration system 100 may be coupled with at least one other similar general encryption key orchestration system 100 to make up the encryption key federation scheme as described herein.

Figure 2:
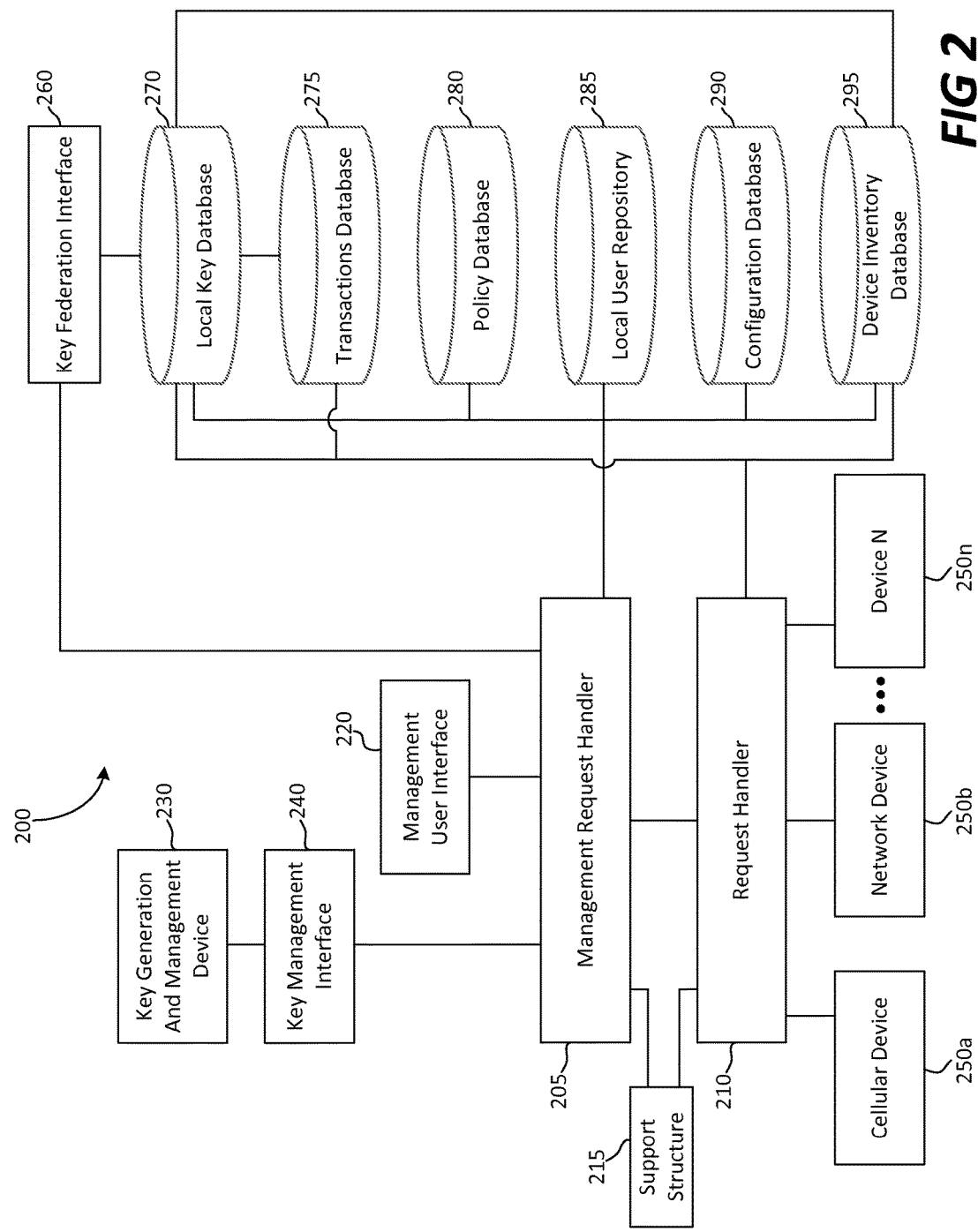
FIG. 2 is a schematic block diagram illustrating an example of an encryption key orchestration system according to various embodiments.

FIG. 2 is schematic diagram illustrating an example of an encryption key orchestration system 200 according to various embodiments. In some embodiments, the encryption key orchestration system 200 may illustrate a particularized implementation of the general encryption key orchestration system 100. From an architectural perspective, embodiments as illustrated for the encryption key orchestration system 200 may be centered around message handling and interoperability with key generation technology, other key orchestration devices, supported communications systems, applications, and infrastructure.

The key orchestration device 110 may include at least a management request handler 205, a request handler 210, a support structure 215, a key federation interface 260, as well as the associated databases (e.g., a local key database 270, transactions database 275, policy database 280, local user repository 285, configuration database 290, device inventory database 295).

In various embodiments, the management request handler 205 may include (or is) the policy engine that may be implemented for policy-based encryption key management, distribution, and federation. As the management request handler 205 can be an intermediary layer between the various components described, rapid integration of the policy-based encryption key management, distribution, and federation may be added to an existing system without having to make changes to the system level message handling. The management request handler 205 may provide a top-down management for various communication devices (e.g., a cellular device 250a, a network device 250b, . . . , a device N 250n, and/or the like) associated with a given enterprise. In various embodiments, each of the cellular device 250a, the network device 250b, . . . , and the device N 250n may be the source device 150a or the target device 150b depending on the particular communication transaction for which the encryption key is generated.

The management request handler 205 and the request handler 210 may be of an agent-interface relationship. That is, the request handler 210 may serve as the interface between the management request handler 205 and the various communication devices associated with the enterprise (e.g., the cellular device 250a, the network device 250b, . . . , the device N 250n, and/or the like). The communication between the management request handler 205 and the request handler 210 may be facilitated by the support structure 215. The support structure 215 may provide suitable communication protocol, management application, infrastructure, communication application program interface (API), configurations, translations, and/or the like for interfacing between the management request handler 205 and the request handler 210.

The request handler 210 may receive key generating requests 175 and/or encryption keys from the various communication devices and relate them to the management request handler 205 with the assistance from the support structure 215. The request handler 210 may also relate the response of the management request handler 205 (including the hint in some embodiments) and/or encryption keys to the various communication devices with the assistance from the support structure 215.

In various embodiments, the management request handler 205 may receive the request 175 for generating an encryption key. Various components may be capable of transmitting the request 175 to the management request handler 205. The some embodiments, the management request handler 205 may receive the request 175 from the various communication devices associated with the enterprise (e.g., the cellular device 250a, network device 250b, . . . , device N 250n, and/or the like). The request 175 may be related by the request handler 210, which may serve as the interface between the devices and the management request handler as described. The key federation interface 260, the management user interface 220, and the key management interface 240 may also transmit the request 175 to the management request handler.

In non-request-driven embodiments, the management request handler 205 may receive encryption keys from at least one key source 170. The key source 170 may be the key generation and management device 230, which may be any suitable existing encryption key generating apparatus implemented within the enterprise. In other words, the key generation and management device 230 may represent any existing schemes internal or external to the communication systems of the enterprise. For example, the key generation and management device 230 may be any suitable native protocol associated with safe net equipment.

Embodiments of the key management interface 240 may represent an internal integration of key generation and key management capabilities as well as an external interface with existing solutions. This is because the key management interface 240 may be poised between the key generation and management device 230 (which may generate encryption keys) and the management request handler 205 (which inspects key attributes 160 of the encryption keys based on policies 115). For example, the key management interface 240 may be a translation interface that maintains a standard encryption management messaging language with the key orchestration device 110. This can allow enterprise interoperability between existing solutions (e.g., the key generation and management device 230) and the key orchestration platform (e.g., the management request handler 205). Accordingly, the policy-based encryption key orchestration systems and methods may be implemented with various types of security object (e.g., encryption key) generation protocols.

Additionally or alternatively, in request-driven embodiments, the management user interface 220 may transmit the request 175 to the management request handler 210. The management user interface 220 may utilize the same API as other components described herein to assure interoperability. The management user interface 220 may include suitable user input and display devices to receive and display data to a designated managing user. In particular embodiments, the management user interface 220 may include a mobile device such as a smartphone or a tablet. The management user interface 220 may also include a wired device.

In some embodiments, the key federation interface 260 may transmit the request 175 to the management request handler 205. The key federation interface 260 may be in communication with a second key federation interface (such as, but not limited to, the key federation interface 260) associated with a disparate enterprise (which may utilize the same or similar key orchestration systems and methods described). When one of the various communication devices (e.g., the cellular device 250a, network device 250b, . . . , device N 250n, and/or the like) wishes communicate with another device from the disparate enterprise (or vice versa), the request 175 may be transmitted (from the key federation interface 260 of the second enterprise) to the key federation interface 260 of the current enterprise. In some embodiments, the request 175 may be directly transmitted to the management request handler 205 when the key federation interface 260 has designated the relationship between the enterprises to be trusted.

In some embodiments, instead of or in addition to the request 175, encryption keys as well as the "allowed" and "denied" messages may be transmitted and received between the key federation interface 260 (of the current and the second enterprise). The encryption key and its associated attributes 160 may be stored in the local key database 270, which may be accessible by the management request handler 205 (for policy inspection) and/or the request handler 210 (for distribution).

The request 175 may be transmitted with further instructions related to generating the encryption key. The further instructions include, but are not limited to, a source of encryption keys, the encryption keys themselves, key attributes 160 associated with the encryption keys, and/or the like.

In various embodiments, in response to receiving the request 175, the management request handler 205 may generate or facilitate the generation of the encryption key. For example, where the request 175 may be silent as to where the encryption key is to be generated (e.g., the key source 170), the management request handler 205 itself may generate the encryption key. The management request handler 205 may generate the encryption key based on the set of policies 115 stored in the policy database 280. In other words, the management request handler 205 may generate the encryption keys with key attributes 160 that would not have violated any policies 115 set forth in the policy database 280.

Where the request 175 may be silent as to where the encryption key is to be generated (e.g., the key source 170), or specifies that a particular key source 170 to generate the encryption key, the management request handler 205 may retrieve or otherwise request the encryption key from a suitable key source 170. The management request handler 205 may request encryption keys from the management user interface 220, the key federation interface 260, the communication devices (e.g., the cellular device 250a, network device 250b, . . . , device N 250n, source device 150a, and target device 150b), key management interface 240, and/or the like.

The management request handler 205 may retrieve encryption keys from a designated database storing encryption keys (e.g., the local key database 270). The local key database 270 may be coupled to other key sources 170 (e.g., the cellular device 250a, network device 250b, . . . , device N 250n, source device 150a, target device 150b, the key generation and management device 230 the key federation interface 260, and/or the like) and store cached encryption keys on behalf of the other key sources 170. The management request handler 205 may retrieve encryption keys from the local key database 270 instead of requesting encryption keys from the key sources 170. This is so that transaction time for retrieving/generating the encryption key may be improved, and that network problems would not hinder the ability of the management request handler 205 to obtain encryption keys, given that the local key database may be local to (e.g., residing on a same network node) the management request handler 205. As the management request handler 205 is retrieving encryption keys from the local key database 270, a verification request may be sent to the key source 170 to ensure whether the encryption key to be retrieved has been altered by the key source 170. A confirmation or an updated encryption key may be sent to the local key database 270 in response, so that the management request handler 205 may accordingly receive the encryption key.

In some embodiments, the management request handler 205, upon receiving encryption keys (whether requested or not) in any manner as described, may cache the encryption key along with the key source identifier and the associated key attributes 160 at the local key database 270. The encryption key, the key source identifier, and the key attributes 160 may be stored in case that the communication is lost or when the encryption key source of the encryption key is not authoritative. Whereas in some embodiments, the encryption key may not be transmitted with the key attributes 160. In such embodiments, the management request handler 205 may determine the key attributes 160 from various sources such as, but not limited to, the local user repository 285, the device inventory database 295, and/or the like.

The management request handler 205 may then inspect the key attributes 160 associated with the encryption key received based on the set of policies 115 stored in the policy database 280. The management request handler 205 may retrieve all policies 115 or only the relevant policies (e.g., based on some or all key attributes 160) from the policy database 280. In some embodiments, the encryption keys generated by the management request handler 205 itself or at the direction of the management request handler 205 may be spared from inspection by policies 115 when they are created based on the policies 115. In other embodiments, all encryption keys generated by the management request handler 205 or at the direction of the management request handler 205 may be inspected by the policies 115. Encryption keys allowable based on the policies 115 may be allowed while unacceptable encryption keys may be denied, in the manner described. The management request handler 205 may be configured to update or add policies stored in the policy database 280 (e.g., as directed by the management user interface 220).

The local user repository 285 may be a database storing information related to local users of the communication devices (e.g., the cellular device 250a, network device 250b, . . . , device N 250n, and/or the like) within the enterprise. In various embodiments, the local user repository 285 may store characteristics/information of the users that would constitute key attributes 160. The characteristics include, but not limited to, privileges, security groups, assigned roles, a combination thereof, and/or the like. The security groups may be stored in a hierarchical tree. The management request handler 205 may access the local user repository 285 for such characteristics and utilize them as key attributes 160 associated with encryption keys requested, transmitted, or received by that device corresponding to such characteristics. The management request handler 205 may add or alter information stored in the local user repository 285. A copy of the information stored in the local user repository 285 may be sent to the local key database 270 as key attributes 160 to be stored in the local key database 270.

In some embodiments, the transaction database 275 may store various communication transactions or potential communication transactions. In some embodiments, the transaction database 275 may store encryption key transmission instances (i.e., instances where encryption keys are to be distributed) to one or more devices. For example, when a particular encryption key cannot/should not be forwarded (e.g., pushed to a communication device) for any reason, the forwarding transaction (e.g., a job) may be queued or otherwise stored within the transactions database 275 for forwarding the encryption key at a later some. The transaction database 275 may also store a status of each particular encryption key transmission instance, which may later be read by the request handler 210. For example, the request handler 210 may at a later time attempt to transmit all or some encryption keys to corresponding communication devices for all "unsent" encryption key transmission instances. The transactions database 275 may be coupled to the local key database 270 to gain access of the keys to be forwarded to each communication device that the encryption key may be generated for.

In further embodiments, the transaction database 275 may be coupled to the request handler 210 and may store the communication transactions (for which the encryption key may be requested, transmitted, or received) and/or the associated key attributes 160. For example, the request handler 210 may transmit such information to the transactions database 275. The transaction database 275 may be coupled to the local key database 270. The communication transactions (as the associated details) may be associated with the encryption keys stored in the local key database 270. The management request handler 205 may need to access only the local key database 270 for the encryption keys and the associated key attributes 260.

The configuration database 290 may store supporting instructions for the key encryption key orchestration system 200. In some embodiments, the configuration database 290 may store internal network, configuration of clients, configuration of applications, IP address allocations, various component configurations, device privileges, device communication pathways, credentials, and/or the like. The configuration database 290 may be coupled to the management request handler 205, which may require the instructions stored within the configuration database 290 for operations.

The management request handler 205 may also add or alter the information stored in the configuration database 290.

In some embodiments, the device inventory database 295 may store information related to the communication devices associated with the given enterprise. For example, information stored may include, but not limited to, security group, security level, geo-location, identification number, internal classification, device specifications, time stamp in which an encryption has been created, a combination thereof, and/or the like. The request handler 210 may be coupled to the device inventory database 295 to store such data therein. The management request handler 205 may be coupled to the device inventory database 295 for accessing such device information. The device inventory database 295 for associating particular cached keys with the corresponding device information as key attributes 160. A copy of the information stored in the device inventory database 295 may be sent to the local key database 270 as key attributes 160.

The key federation interface 260 may allow one key orchestration device 110 to federate encryption key information with one or more other key orchestration devices 110 (through their associated respective key federation interfaces 260) based on an established trust relationship. Each enterprise may include by a key orchestration device 110. As such, the key federation interface 260 may maintain a trust relationship with the communication systems of at least one other enterprise. It is, in other words, a gateway to extend trust.

Figure 3:
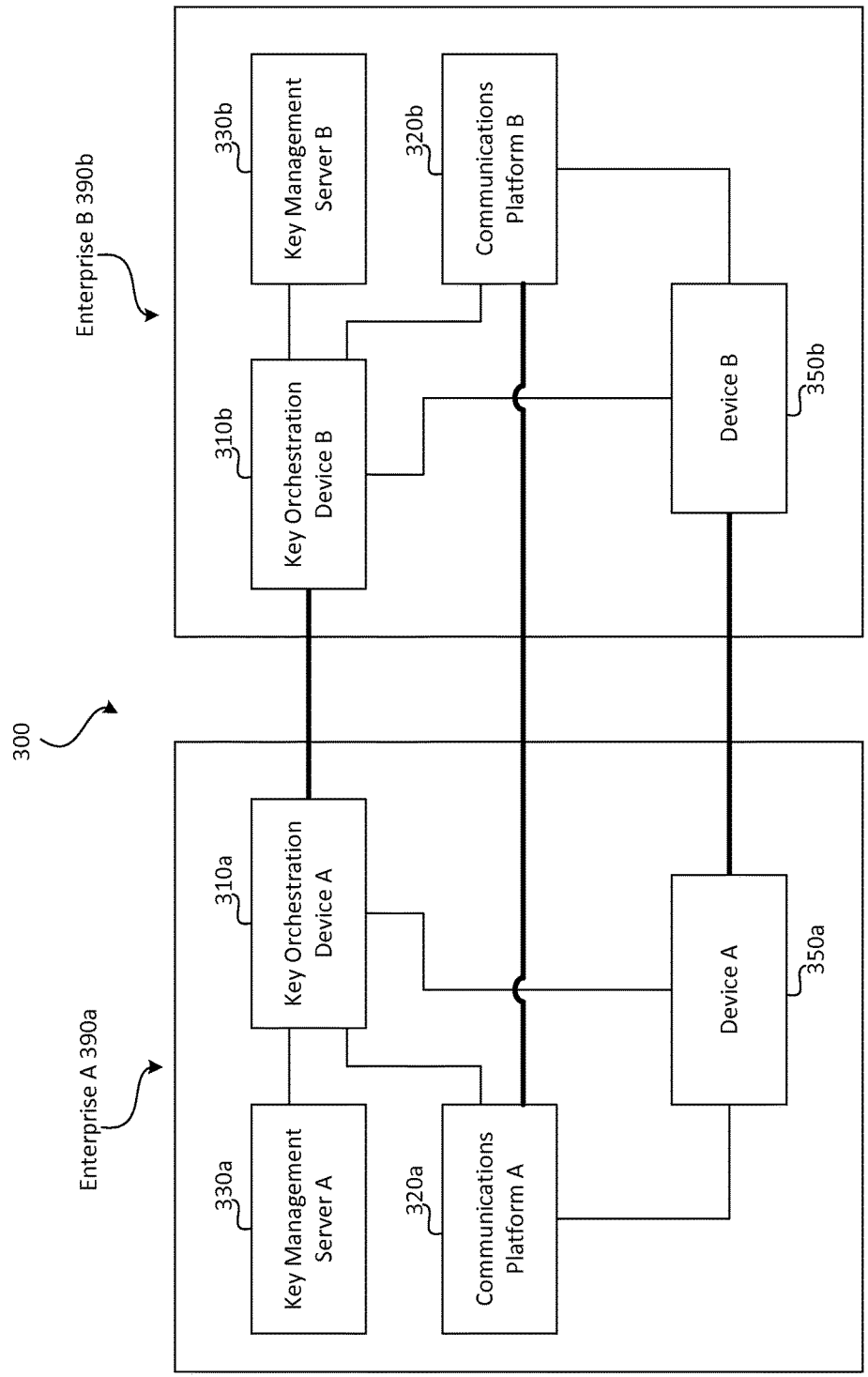
FIG. 3 is a schematic block diagram illustrating an example of an encryption key federation system as implemented in various embodiments.

FIG. 3 illustrates an example of an encryption key federation system 300 as implemented in various embodiments. The key federation system 300 may implement the key orchestration device 110 as set forth with respect to FIGS. 1-2. The key federation system 300 may be based on extra-enterprise communication relationship and key federation enabled by the key orchestration device 110 (e.g., the management request handler 205 and the associated components).

Encryption keys (e.g., asymmetric encryption keys, symmetric encryption keys, and/or the like) generated by components within one enterprise (e.g., enterprise A 390a) may be distributed to a disparate key orchestration device (e.g., the key orchestration device 110, the management request handler 205, and its associated components, and/or the like) of another enterprise (e.g., enterprise B 390b) pursuant to inspection by the policies 115 of either (or both) enterprises. This can enable secured communications or data exchange with outside entities (e.g., enterprises) based on the federated trust model. This can also allow encryption management to parallel communications management in supporting external communications to enable symmetric key encryption for communications. Accordingly, performance of the communications platform may be improved, given that utilization of asymmetric encryption may be expensive from a processing perspective as compared to symmetric encryption.

In the key federation system 300, each enterprise (e.g., the enterprise A 390a or the enterprise B 390b) may be associated with a respective one of a key orchestration device A 310a and a key orchestration device B 310b). Each of the key orchestration device A 310a and the key orchestration device B 310b may be the key orchestration device 110. The key orchestration device A 310a and the key orchestration device B 310b may be in communication with one another through any suitable network. In particular, the key federation interfaces (e.g., the key federation interface 260) of each of the key orchestration device A 310*a* and the key orchestration device B 310*b* may be in communication with one another.

In various embodiments, the key management server A 330*a* and the key management server B 330*b* may be a device such as, but not limited to, the key generation and management device 230 and the key management interface 240. Each of the key management server A 330*a* and the key management server B 330*b* may be coupled to their respective key federation interfaces 206 within their respective enterprises in the manner described.

A device A 350*a* and a device B 350*b* may attempt to obtain an encryption key for the communication therebetween. Each of the device A 350*a* and the device B 350*b* may be the source device 150*a*, the target device 150*b*, the cellular device 250*a*, the network device 250*b*, . . . , the device N 250*n*, a combination thereof, and/or the like.

An encryption key may be generated within one enterprise (e.g., enterprise A 390*a*) from any suitable key source 170 in the manner described. The encryption key may be generated by the enterprise A 390*a* (e.g., by a key source 170 in the enterprise A 390*a*) with or without a request 170 from either enterprise B 390*b* or within enterprise A. The encryption key may likewise be generated by the enterprise B 390*b* in a similar manner. The encryption key and its associated key attributes 160 may be presented to the policy engine of enterprise A 390*a* (e.g., the key orchestration device A 310*a*, which may include the management request handler 205 and its associated components) for inspection in the manner described. In response to the policy engine of enterprise A 390*a* determining the encryption key is accepted based on the encryption key attributes 160, the key orchestration device 310*a* (e.g., the key federation interface 260) of enterprise A 390*a* may relate the encryption key as well as its associated key attributes 160 to the key orchestration device B 310*b* (e.g., the key federation interface 260) of enterprise B 390*b*.

Upon receiving the encryption key and its associated key attributes 160, the encryption key and its associated key attributes 160 may be presented to the policy engine of enterprise B 390*b* (e.g., the key orchestration device B 310*b*, which may also include the management request handler 205 and its associated components) for inspection in the manner described. The encryption key may be forwarded to both the device A 350*a* and the device B 350*b* when the key orchestration device B 310*b* determines that the encryption key is consistent with its policies 115 defined for enterprise B 390*b*. In other words, the encryption key (as defined by its key attributes 160) may be allowed only if it is consistent with both sets of policies 115 of enterprise A 390*a* as well as enterprise B 390*b*. At least some of the set of policies 115 of enterprise A 390*a* may be different from at least some of the set of policies 115 of enterprise B 390*b*. Whereas the encryption key is found not allowable by either the key orchestration device A 310*a* or the key orchestration device b 310*b*, the encryption key may be returned back to the key source 170 with the "denied" message and/or the hint in the manner described.

In other embodiments, acceptance by policies 115 associated with only one enterprise (e.g., either enterprise A 390*a* or enterprise B 390*b*) may be sufficient for encryption key to be allowed. In such cases, the trust extends to some or sometimes all of the policies 115. In addition, each enterprise may include a set of policies 115 for the federated instances (e.g., each enterprise may have agreed with the other regarding a set of policies 115 used when communications between the communication devices of the enterprises are to occur. Accordingly, each enterprise may store (e.g., in each respective policy database 280) a same set of federated (mutual and reciprocal) policies for the federated schemes. The federated policies may be the same for both the enterprise A 390*a* and the enterprise B 390*b*. Thus, allowance by one key orchestration device associated with one enterprise may be sufficient for the encryption key to be forwarded for usage for communication between both enterprises.

In various embodiments, enterprise federation policies may be stored within each policy database 280. The enterprise federation policies may specify the manner in which the encryption keys may be federated. For example, the enterprise federation policies may specify the federated policies, which key orchestration device may inspect the key attributes 160, which enterprise may issue a request 175 for an encryption key, which enterprise may generate an encryption key, a combination thereof, and/or the like. The enterprise federation policies allow flexibility in policy defining. For example, the enterprise federation policies may specify that enterprises may each include its own policies 115 in addition to the federated policies, where at least a part the policies 115 of each enterprise may be disparate.

In some embodiments, a communication platform A 320*a* and a communication platform B 320*b* of each respective enterprise may be in communication with one another via any suitable network. Such communication between the communication platforms may be encrypted communications, where the encryption key corresponding to such communication may also be presented for inspection by policies 115 similar to described with respect to the devices (e.g., the device A 350*a*, the device B 350*b*, and/or the like). Each communication platform may be in communication to a respective device, such that configurations related to the key orchestration systems may be exchanged.

Figure 4:
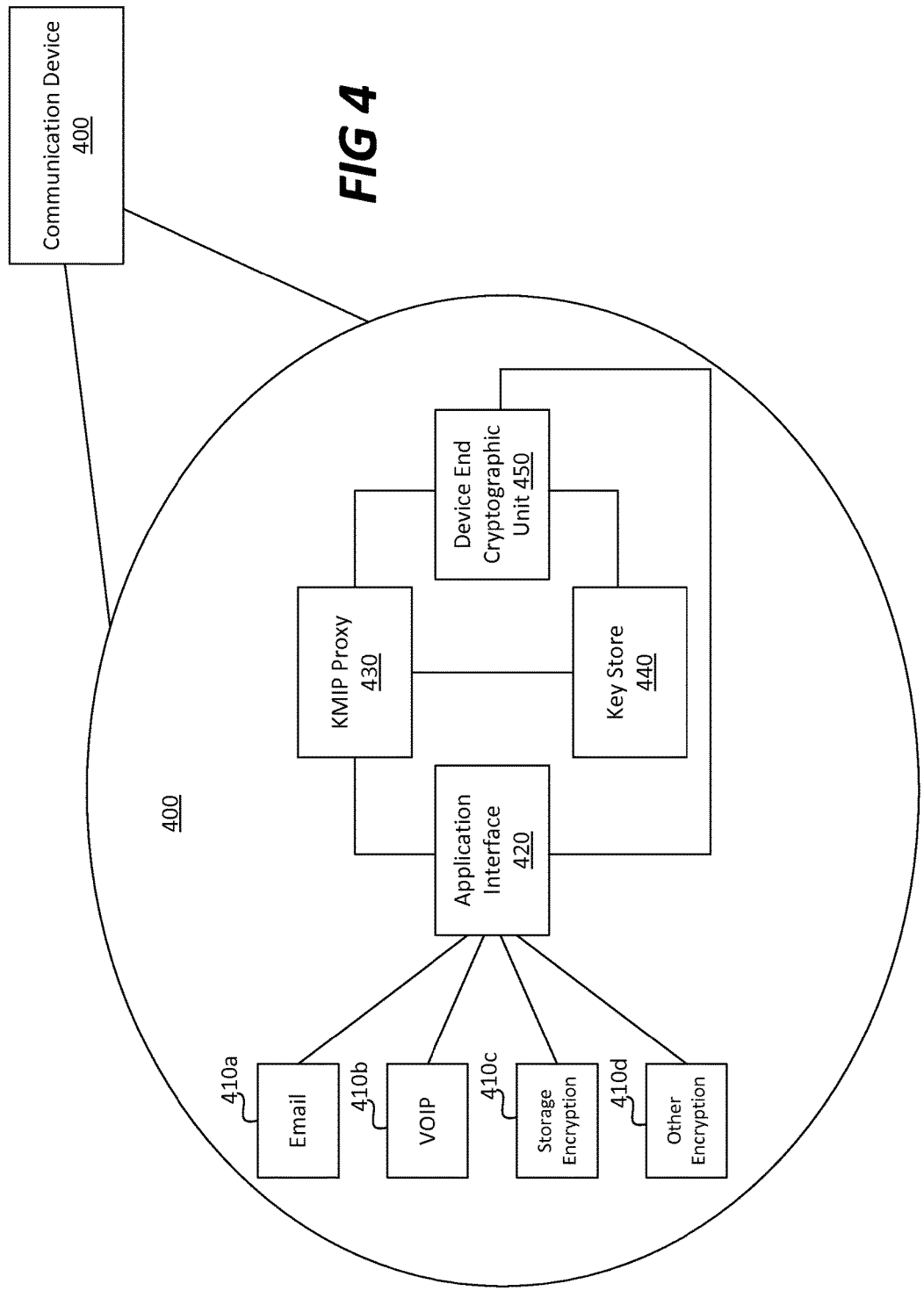
FIG. 4 is a schematic block diagram illustrating an example of a communication device consuming key orchestration services according to some embodiments.

FIG. 4 illustrates an example of a communication device 400 consuming key orchestration services as part of the enterprise according to some embodiments. Referring to FIGS. 1-4, the communication device 400 may be a device such as, but not limited to, the source device 150*a*, the target device 150*b*, the cellular device 250*a*, the network device 250*b*, . . . , the device N 250*n*, the device A 350*a*, the device B 350*b*, a combination thereof, and/or the like. In some embodiments, the communication device 400 leverages key orchestration to receive encryption keys (or key updates) associated with applications such as, but not limited to, an Email application 410*a*, voice-over-internet protocol (VoIP) application 410*b*, storage encryption 410*c*, and/or other encryption applications 410*d* on the communication device 400.

The communication device 400 may be registered with a key orchestration platform to receive key orchestration services. The communication device 400 may provide an application interface 420 based configured to receive with encryption key distribution and encryption key management messages (e.g., the "allowed" message, the "denied" message, the hint, and/or the like) from the key orchestration device 110. The application interface 420 may be coupled to each of the Email application 410*a*, voice-over-internet protocol (VoIP) application 410*b*, storage encryption 410*c*, and/or other encryption applications 410*d* to forward the accepted encryption key to them.

This communication device 400 may also utilize KMIP by a KMIP proxy 430 to receive KMIP type commands from the key orchestration device 110. The KMIP proxy 430 may be connected to the key store 440 for managing the encryption keys stored therein. The KMIP proxy 430 may also be connected to a device-end cryptographic unit 450. The device-end cryptographic unit 450 may be configured to generate encryption keys. In response to the "denied" message, the device-end cryptographic unit 450 may generated a different encryption key to present to the policy engine for inspection. Whereas the hint is given, the device-end cryptographic unit 450 may generate a different encryption key based on the hint. The device-end cryptographic unit 450 may cache its encryption keys in the key store 440. The device-end cryptographic unit 450 may be coupled to the application interface 420. The application interface 420 may transmit the encryption keys generated along with the key attributes 160 to the policy engine and forward the response of the policy engine to the device-end cryptographic unit 450 e.g., when the response is negative.

Accordingly, operation-level policy inspection may be achieved. Given that the communication device 400 may be capable to interact with the policy engine regarding the encryption keys, the ability to service the request for an encryption key (or inspect the encryption key) by a third-party device (e.g., the policy engine residing in the key orchestration device 110) acting as administrating may be achieved. The request 175 for an encryption key or the encryption key may be serviced each communication transaction.

Figure 5:
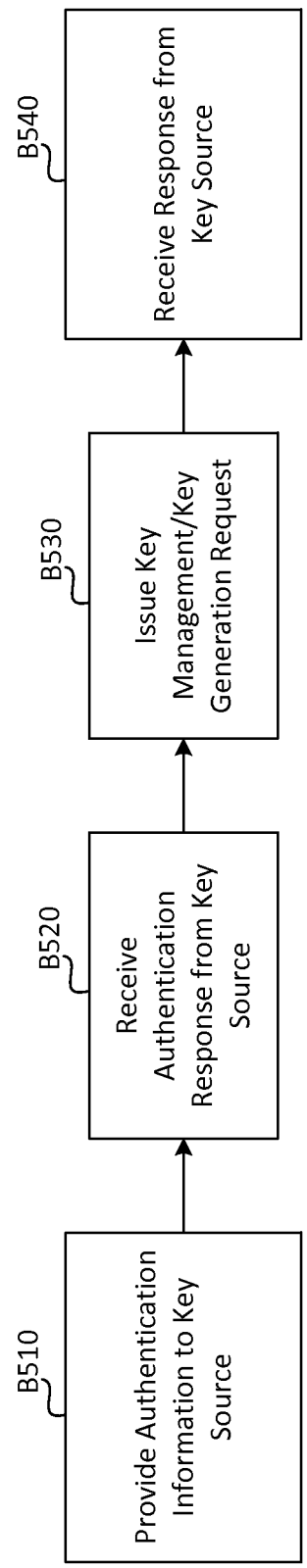
FIG. 5 is a process flow diagram illustrating an example of a request authentication process for issuing requests and receiving encryption keys according to some embodiments.

FIG. 5 illustrates an example of a request authentication process 500 for issuing requests 175 for encryption keys in various encryption key orchestration systems according to some embodiments. The request authentication process 500 may be internal to the key orchestration device 110, when the key orchestration device 110 (e.g., the management request handler 205, the key orchestration device A 310a, the key orchestration device B 310b, and/or the like) itself generates the encryption keys. In other embodiments, the request authentication process 500 may be external to the key orchestration device 110 to support integration with existing key management and key generation infrastructure (e.g., the key generation and management device 230, the key management server A 330a, the key management server B 330b, and/or the like).

First, at block B510, the key orchestration device 110 may provide authentication information to an key source 170. As described, such key source 170 may be the key orchestration device 110 itself, the key generation and management device 230, the management user interface 220, the key federation interface 260, the communication devices (e.g., the cellular device 250a, network device 250b, . . . , device N 250n, source device 150a, target device 150b, device A 350a, device B 350b, communication device 400, a combination thereof, and/or the like), and/or other external key sources. The authentication information may be any suitable authentication method, such as username/passcode request, security handshake algorithms, biometric request, a combination thereof, and/or the like.

Next, at block B520, the key orchestration device 110 may receive authentication response from the key source 170. The key orchestration device 110 may authenticate the response and establish trusted relationship between the key source 170 and the key orchestration device 110. Next at block B530, the key orchestration device 110, the management user interface 220, the key generation and management device 230, the communication devices, and other API calls may issue a key management/generation request (e.g., the request 175) to the key source 170. In some embodiments, the key orchestration device 110 may forward the request 175 from a trusted third party (e.g., the communication devices, the management user interface 220, the key federation interface 260, and/or other third-party devices) to the key source 170. In some embodiments, the request 175 may be directly sent to the key source 170. The key orchestration device 110 may be configured to determine whether to generate encryption keys itself or forward the request to another key source 170 when the request 175 does not identify the key source 170. Next, at block B540, the key orchestration device 110 may receive response (e.g., the encryption keys as requested) from the key source 170.

Subsequently, the encryption keys obtained by the key orchestration device 110 may be evaluated based on the key attributes 160 and the policies 115 in the manner described. When allowed, the encryption keys may be distributed to the communication devices associated with the corresponding communication transaction. When denied, the key orchestration device 110 may transmit the "denied" message (and in some instances, the hint) and standby for new encryption keys.

In some embodiments, multiple requests may be sent to a plurality of key sources 170, each request may correspond to a single communication transaction. In response, the multiple responses (e.g., encryption keys) may be received from the key sources 170. In other embodiments, multiple requests may be sent to a plurality of key sources 170, where two or more requests may correspond to a same communication transaction. As the key orchestration device 110 may receive two or more encryption keys from the key sources 170. The key orchestration device 110 may determine one of the two or more encryption keys for the communication transaction based on the policies 115 (e.g., the most secure out of the two or more encryption keys).

Accordingly, large scale distribution by the key orchestration device 110 may be possible in systems including at least one source for the encryption keys and multiple recipient communication devices.

Figure 6:
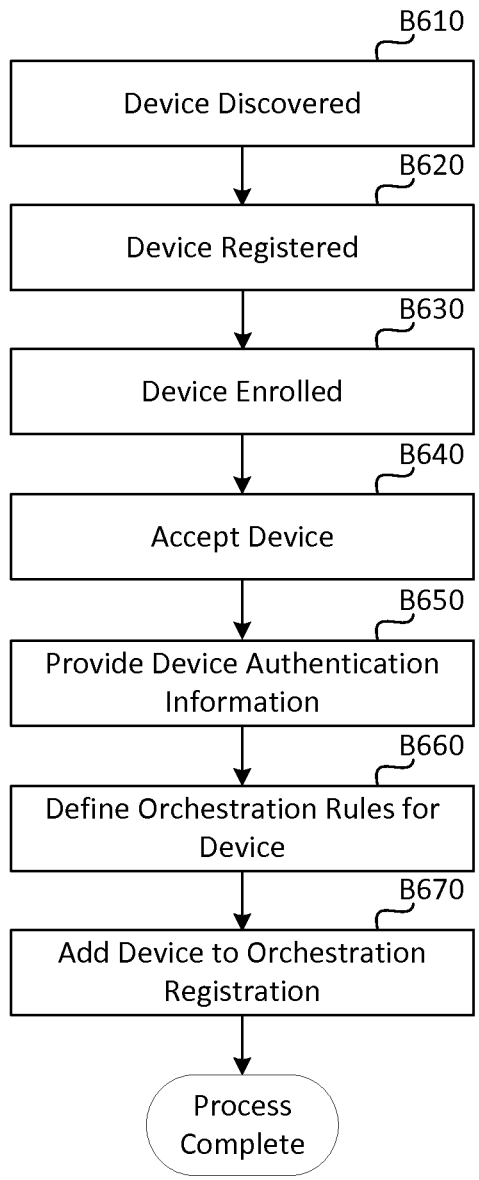
FIG. 6 is a process flow diagram illustrating an example of a communication device registration process implemented in various key orchestration systems according to various embodiments.

FIG. 6 is a process flow diagram illustrating an example of a communication device registration process 600 implemented in various key orchestration systems according to various embodiments. Blocks B610, B620, B630 may be executed simultaneously or sequentially in that order. First, at block B610 the communication device may be discovered (e.g., by the request handler 210). The request handler 210 may detect that the communication device is present within the enterprise (e.g., the networks associated with the enterprise) automatically.

At block B620, the communication device may be registered (e.g., by the request handler 210). In some embodiments, configuration information related to the key orchestration systems may be transmitted to the communication device. Device information of the communication device may be transmitted to the local user repository 285, device inventory database 295, and/or the like. At block B630, the communication device may be enrolled (e.g., by the request handler 210). For example, the communication device may transmit a server authentication request the request handler 210 and receiving a positive authorization response.

Next, at block B640, the communication device may be accepted (e.g., by the request handler 210). For example, the request handler 210 and/or the management request handler 205 may check existing policies 115 based on the device information to determine whether the communication device has been classified in the appropriate group, whether the key orchestration device 110 may be capable of orchestrating the communication device, a combination thereof, and/or the like.

Next, at block B650, the request handler 210 may provide device authentication information to the communication device. The authentication information may include configurations (e.g., credentials, passcodes, and/or the like) to access the key orchestration device 110. Next, at block B660, the request handler 210 and/or the management request handler 205 may define orchestration rules for the communication device. Following block B660 at block B670 a corresponding identifier, the commination device has been added to an orchestration registration. Subsequently, the communication device may request for encryption keys, generate encryption keys, receive approved encryption keys, and/or the like in the manner described. Such process ensures that the communication device utilizing services provided by the key orchestration device 110 may meet the operable standards of the key orchestration device 110.

Figure 7:
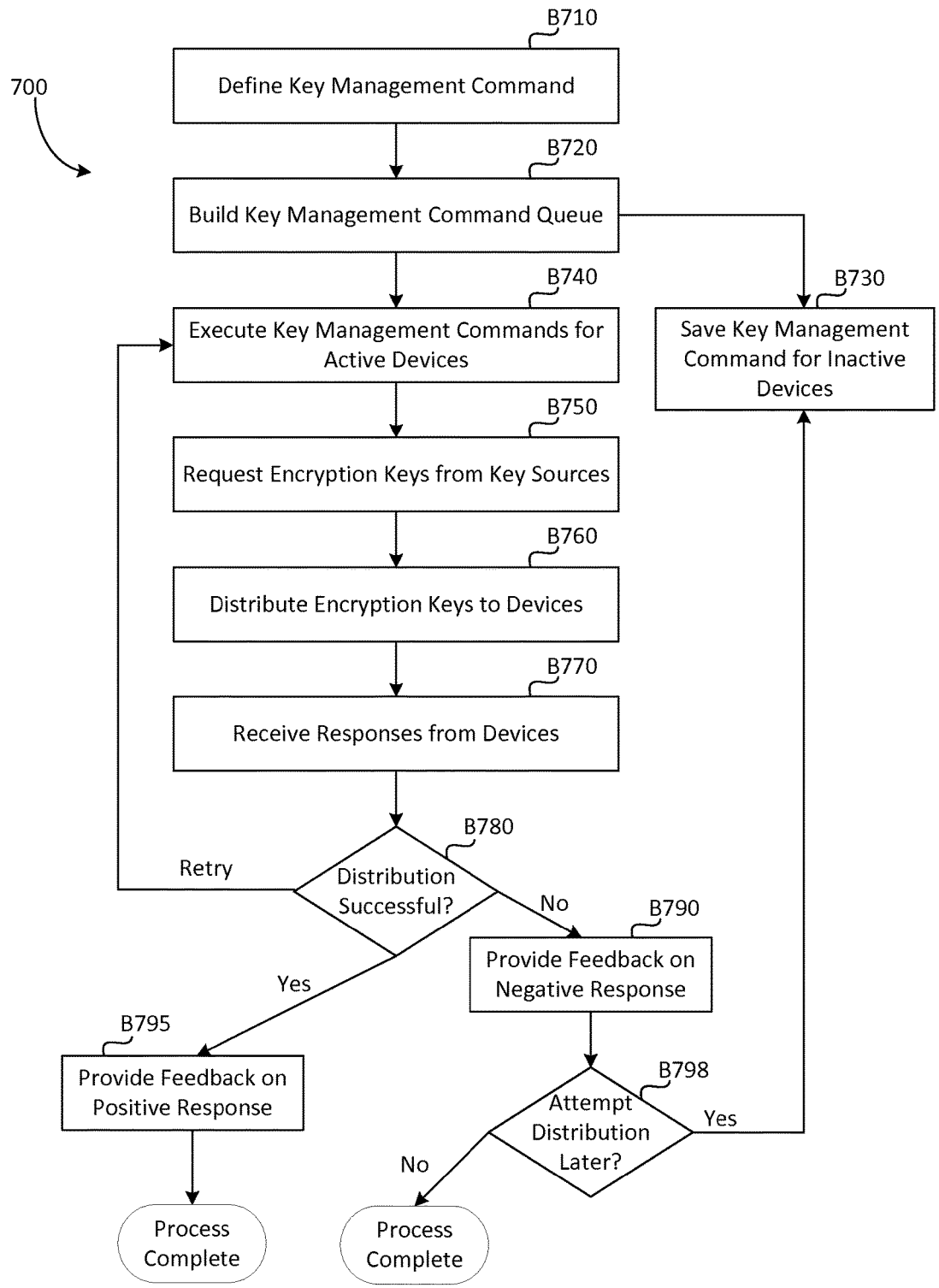
FIG. 7 is a process flow diagram illustrating an example of a key management and distribution process according to various embodiments.

FIG. 7 illustrates an example of a key management and distribution process 700 according to various embodiments. Referring to FIGS. 1-7, the key management and distribution process 700 may be implemented with communication devices registered, discovered, and/or enrolled with the key orchestration device 110.

First, at block B710, the management request handler 205 may define key management command. A key management command may be a particularized command for a key management event (e.g., "job"). The key management event may be an event triggering a set of algorithms to create encryption keys based on the policies 115 and distribute (e.g., push) the encryption keys to at least one of the communication devices (e.g., the cellular device 250a, network device 250b, . . . , device N 250n, source device 150a, target device 150b, device A 350a, device B 350b, communication device 400, a combination thereof, and/or the like).

In some embodiments, the key management event may be based on time. For example, the management request handler 205 may be configured to rekey for at least some (sometimes all) of the communication devices associated with the enterprise (or another enterprise) periodically (e.g., every day, every week, every month, and/or the like). In various embodiments, the key management event may occur automatically through an API call. The API call may be issued from any components internal and/or external to the key orchestration device 110 within a same or disparate enterprise.

The key management event may also be user-defined. For example, the management user interface 220 may receive user input from the designated user to generate encryption keys immediately for at least one communication device. In such examples, such user-defined key management events may be initiated in response to a sudden event, including cyber-attacks, security breaches, change to the polices 115, and/or the like. The management user interface 220 may also alter the policies 115 stored within the policy database 280 in response to these key management events. The new encryption keys created must follow the altered set of policies 115.

The key management command may include providing encryption key to some or all communication devices within the same or a disparate enterprise, re-transmitting a same or different encryption key to some or all communication devices within the same or disparate enterprise, a combination thereof, and/or the like. In various embodiments, the management request handler 205 may define for a plurality of key management commands, each of which may correspond to a communication transaction and/or communication device associated with the enterprise. In further embodiments, the management request handler 205 may define key management commands for communication devices associated with a disparate enterprise when allowed by the federation model. The management commands (e.g., encryption keys) may be transmitted via the key federation interfaces 260 associated with each enterprise.

Next, at block B720, the management request handler 205 may build a key management command queue. A job created in response to the key management event may include a plurality of key management commands, each of which may correspond to a communication device and/or a communication transaction. Accordingly, where the key management commands are generating new encryption keys and distributing to two or more communication devices, the key management commands may be queued (e.g., stored within the transactions database 275) for execution, given the volume of the key management commands. As such, a composite command may correspond to key management commands for multiple key sources to issue encryption keys to multiple encryption key receiving communication devices. The composite command may be associated with a plurality of key management commands, and may be stored as a whole in the transaction database 275 awaiting distribution. Thus, even if a server (e.g., the management request handler 205) is shut off before all the key management commands are executed/distributed, the process may resume as soon as the sever is switched on.

Key management command associated with inactive communication devices (e.g., communication devices that may be turned off and/or off the network) may be stored in the transactions database 275 for future distribution (e.g., when the inactive communication devices are switched on) by the management request handler 205 at block B730. On the other hand, for active devices (e.g., communication devices that may be turned on and/or on the network), the key management command may be executed by the management request handler 205 at block B740.

For example, the management request handler 205 may request encryption keys from key sources 170 based on the key management commands at block B750. For example, the key management commands may specify one or more key sources 170 to issue encryption keys to the communication devices. Accordingly, some communication devices may receive encryption keys from a first key source while other communication devise may receive encryption keys from a second different key source. Next, at block B760, the management request handler 205 may distribute encryption keys to the communication devices. In some embodiments, the management request handler 205 may perform encryption key inspection based on the key attributes 160 and the set of policies 115 in the manner described. Once approved, the management request handler 205 may forward the encryption keys to the corresponding communication devices through the request handler 210.

Next, at block B770, the management request handler 205 may receive response to the distribution from the communication devices. For example, the management request handler 205 may determine, based on the responses of the communication devices, whether such distribution was successful at block B780. Whereas the management request handler 205 determines that the distribution was successful with respect to a given communication device (e.g., that communication device has received the encryption key distributed to it), positive feedback may be provided to the management request handler 205 at block B795.

On the other hand, whereas the management request handler 205 determines that the distribution was unsuccessful (e.g., that communication device has not received the encryption key distributed to it) for a given communication device, a negative response of that communication device may be provided to the management request handler 205 at block B790. The management request handler 205 may then determine whether to attempt to execute the key management command again at a later time for that communication device based on preexisting algorithms or user input at block B798.

When management request handler 205 determines that execution of the key management commands (e.g., the distribution of the encryption) is not to be attempted again (B798:NO), the process ends. On the other hand, whereas the management request handler 205 determines that key management commands not successfully distributed are to be attempted again (B798:YES), the key management commands may be stored at block B730 (e.g., in the transactions database 275) for future distribution.

In some embodiments, when distribution of the key management commands may be unsuccessful, the management request handler 205 may determine to retry distribution of the unsuccessful key management commands (B780: RETRY). For example, the management request handler 205 may again execute key management commands for active devices at block B740.

Figure 8:
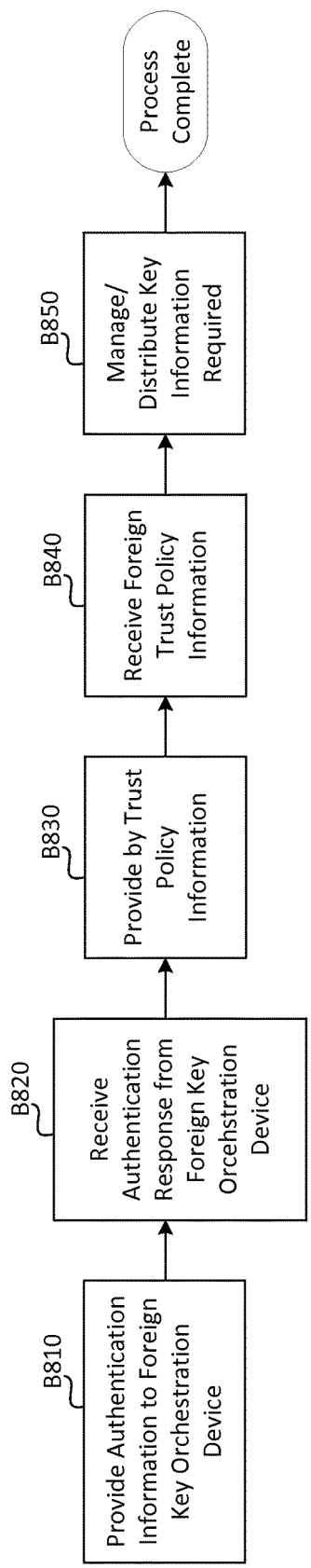
FIG. 8 is a process flow diagram illustrating an example of a key federation process according to various embodiments.

FIG. 8 is a process flow diagram illustrating an example of an encryption key federation process 800 according to various embodiments. Referring to FIGS. 1-8, key orchestration devices 110 (e.g., both in a same local enterprise and in a foreign enterprise) may mutually authenticate and distribute encryption keys based on the policies 115 implemented for key orchestration devices 110 or each enterprise for federating encryption keys from one enterprise to another enterprise. In addition, the encryption key federation process 800 may also include the receiving of encryption keys from a foreign key orchestration device as a result of the federation policy of the foreign key orchestration device.

First, at block B810, the local key orchestration device (e.g., the key orchestration device A 310*a*) may provide authentication information to a foreign key orchestration device (e.g., the key orchestration device B 310*b*). The authentication information may be any suitable authentication prompt and/or request for federation. Next, at block B820, the local key orchestration device may receive authentication response from the foreign key orchestration device agreeing to initiation the federation model. The blocks B810 and B820 may represent typical security credential handshakes, where federation trust has been established between the two enterprises.

Next, at block B830, the local key orchestration device may provide trust policy information to the foreign key orchestration device. At block B840, the local key orchestration device may receive trust policy information from the foreign key orchestration device. The trust policy information may include any configurations, settings, extent of trust, mutually agreed policies, a combination thereof, and/or the like.

Next, at block B850, the local key orchestration device and the foreign key orchestration device may manage and distribute key information (e.g., the encryption key, the associated key attributes 160, a combination thereof, and/or the like) in the manner described.

In particular embodiments, the foreign key orchestration device transmit the request 175 to the local key orchestration device for generating the encryption key for a communication transaction between a communication device associated with the foreign key orchestration device and a communication device associated with the local key orchestration device. The encryption key may be generated by the local key orchestration device and inspected by local policy engine. The encryption key may be transmitted to the foreign key orchestration device for inspection by the foreign policy engine in some embodiments, but not others.

In some embodiments, instead of the request 175, the foreign key orchestration device may transmit a generated encryption key (which may or may not have been inspected by policy engine of the foreign key orchestration device depending on trust policy information specified). The local key orchestration device may or may not inspect the encryption key and its associated key attributes 160 by policies 115 based on the trust policy information specified between the enterprises.

Figure 9:
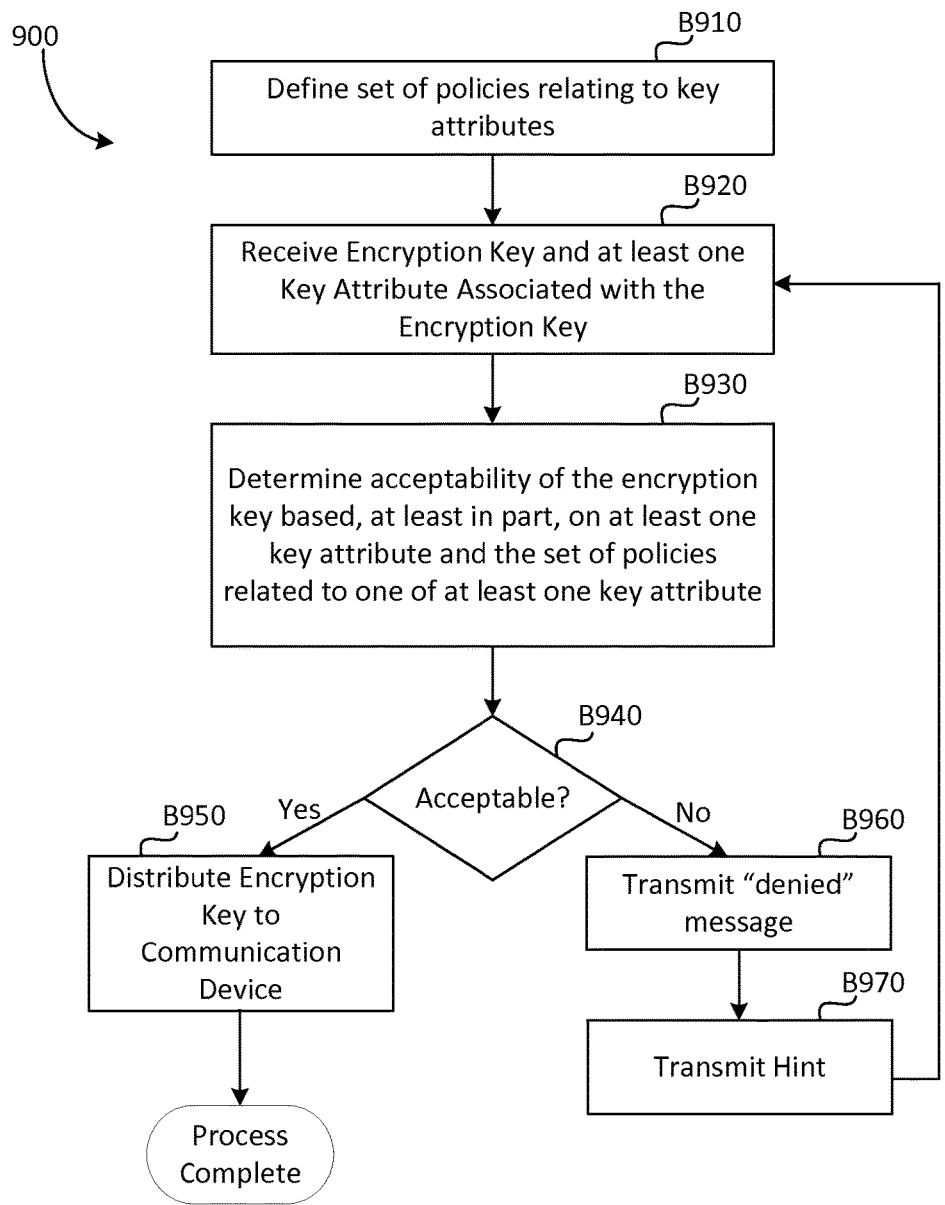
FIG. 9 is a process flow diagram illustrating an example of an encryption key management and distribution process according to various embodiments.

FIG. 9 is a process flow diagram illustrating an example of an encryption key management and distribution process 900 according to various embodiments. In various embodiments, the encryption key management and distribution process 900 may incorporate elements of key orchestration, including key management, key distribution, and key federation.

First, at block B910, a set of policies 115 may be defined, where each policy 115 may relate to one or more key attributes 160. The policies 115 may be defined by designed personnel and stored in the policy database 280 for future retrieval and update. Next, at block B920, the management request handler 205 may receive encryption key and at least one key attribute associated with the encryption key from the key source 170 in the manner described.

Next, at block B930, the management request handler 205 may determine acceptability of the encryption key received based, at least in part, on the at least one key attribute and the set of policies 115 that relate to one of the at least one key attribute. For example, the management request handler 205 may check a value corresponding to a key attribute 160 to determine whether the value is within an acceptable range as defined by the policies 115 in the manner described.

Next, at block B940, the management request handler 205 may determine whether the encryption key is acceptable. Whereas the encryption key is acceptable (B940:YES), the management request handler 205 may distribute the encryption key to the communication devices requiring the key for the communication transaction therebetween, at block B950. On the other hand, whereas the encryption key is unacceptable (B940:NO), the management request handler 205 may transmit the "denied" message to the key source 170 at block B960. Optionally, the management request handler 205 may transmit the hint to the key source to facilitate key generation at block B970. The management request handler 205 may then standby until receiving a second encryption key (and associated key attributes 160) at block B920.

The key orchestration system (e.g., the key orchestration device 110, the management request handler 205, key orchestration device A 310*a*, key orchestration device B 310*b*, and/or the like) described herein may be implemented on any suitable computing devices having a processor and a memory device. The processor may include any suitable data processing device, such as a general-purpose processor (e.g., a microprocessor), but in the alternative, the processor may be any conventional processor, controller, microcontroller, or state machine. The processor may also be implemented as a combination of computing devices, e.g., a combination of a DSP and a microprocessor, a plurality of microprocessors, at least one microprocessors in conjunction with a DSP core, or any other such configuration. The memory may be operatively coupled to the processor and may include any suitable device for storing software and data for controlling and use by the processor to perform operations and functions described herein, including, but not limited to, random access memory RAM, read only memory ROM, floppy disks, hard disks, dongles or other RSB connected memory devices, or the like.

The key orchestration device 110, the management request handler 205, key orchestration device A 310a, and/or key orchestration device B 310b may be implemented on suitable operating systems (OS) such as, but not limited to, the Linux OS, Windows, the Mac OS, and the like. Additionally, the key orchestration device 110, the management request handler 205, key orchestration device A 310a, and/or key orchestration device B 310b may be implemented on small form factors such as embedded systems.

The embodiments described with respect to FIGS. 1-9 relate to encryptions keys. It should be appreciated by one of ordinary skills in the art that, in other embodiments, the systems and methods directed to the key orchestration device 110 involving management, distribution, and federation may be likewise implemented for other sensitive objects such as, but not limited to, user identity information, certificates, biometric data, random number generator data, determinate random number generator data, non-determinate random number generator data, user authentication information, policy components, other components associated with organization security component, and/or the like.

Various embodiments described above with reference to FIGS. 1-9 include the performance of various processes or tasks. In various embodiments, such processes or tasks may be performed through the execution of computer code read from computer-readable storage media. For example, in various embodiments, one or more computer-readable storage mediums store one or more computer programs that, when executed by a processor cause the processor to perform processes or tasks as described with respect to the processor in the above embodiments. Also, in various embodiments, one or more computer-readable storage mediums store one or more computer programs that, when executed by a device, cause the computer to perform processes or tasks as described with respect to the devices mentioned in the above embodiments. In various embodiments, one or more computer-readable storage mediums store one or more computer programs that, when executed by a database, cause the database to perform processes or tasks as described with respect to the database in the above embodiments.

Thus, embodiments include program products comprising computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can comprise semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may comprise, for example, instructions and data which cause a computer or processing machine to perform certain functions, calculations, actions, or the like.

The embodiments disclosed herein are to be considered in all respects as illustrative, and not restrictive. The present disclosure is in no way limited to the embodiments described above. Various modifications and changes may be made to the embodiments without departing from the spirit and scope of the disclosure. Various modifications and changes that come within the meaning and range of equivalency of the claims are intended to be within the scope of the disclosure.

What is claimed is:

1. A process for orchestrating a security object, the process comprising:
   defining and storing a plurality of policies in a database coupled to a policy engine;
   receiving, by the policy engine, the security object for distributing at least one communication device and at least one object attribute associated with the security object;
   determining, with the policy engine, acceptability of the security object based, at least in part, on the at least one object attribute and at least one of the plurality of policies corresponding to the at least one object attribute; and
   distributing the same security object to the at least one communication device associated with the policy engine in response to the security object being determined to be acceptable, wherein the at least one communication device establishes communication based, at least in part, on the security object.

2. The process of claim 1, wherein the security object is an encryption key.

3. The process of claim 1, wherein the at least one object attribute comprise characteristics of at least one of the security object, a first device generating the security object, a second device transmitting the security object, a third device receiving the security object, a first user associated with the first device, a second user associated with the second device, and a third user associated with the third device.

4. The process of claim 1, wherein the at least one object attribute comprises at least one of a security object size, time when the security object is generated, geo-location where the security object is generated, classification of the security object, role associated with a key source, role associated with a source device, and role associated with a target device.

5. The process of claim 4, wherein the plurality of policies comprises accepting the security object when the security object size is within a predetermined size range.

6. The process of claim 4, wherein the plurality of policies comprises accepting the security object when the security object is generated within a predetermined time interval.

7. The process of claim 4, wherein the plurality of policies comprises accepting the security object when the geo-location where the security object is generated is within a predetermined area.

8. The process of claim 4, wherein the plurality of policies comprises accepting the security object when the classification of the security object is associated with a predetermined security object classification group.

9. The process of claim 4, wherein the plurality of policies comprises accepting the security object when the role associated with the key source, the source device, or the target device is associated with a predetermined group of roles.

10. The process of claim 1, further comprising:
    transmitting a rejection indicator to a key source; and
    transmitting a hint informing inadequacies of the security object to the key source, wherein the security object is received from the key source.

11. The process of claim 1, wherein the receiving, by the policy engine, the security object comprises:

receiving, by the policy engine, a request to generate the security object; and generating, by the policy engine, the security object.

12. A process for orchestrating a security object, the process comprising:

defining and storing a first plurality of policies in a first database of a first key orchestration device, the first database being associated with a first enterprise;

receiving, with the first key orchestration device associated with the first enterprise, the security object for distributing to at least one communication device and at least one object attribute associated with the security object from a second key orchestration device associated with a second enterprise;

determining, with the first key orchestration device, acceptability of the security object based, at least in part, on the at least one object attribute and at least one of the first plurality of policies corresponding to the at least one object attribute; and distributing the same security object to a first communication device associated with the first enterprise.

13. The process of claim 12, further comprising defining and storing a second plurality of policies in a second database of the second key orchestration device, wherein at least a first portion of the first plurality of policies and a second portion the second plurality of policies is the same.

14. The process of claim 12, further comprising:

transmitting, from the first key orchestration device to the second key orchestration device, the security object; and distributing the security object to a second communication device associated with the second enterprise, wherein the first communication device and the second communication device may establish communication based on the security object.

15. The process of claim 13, further comprising:

transmitting, from the first key orchestration device to the second key orchestration device, the security object;

determining, with the second key orchestration device, the acceptability of the security object based, at least in part, on the at least one object attribute and at least one of the second plurality of policies corresponding to the at least one object attribute; and distributing the security object to a second communication device associated with the second enterprise, wherein the first communication device and the second communication device may establish communication based on the security object.

16. The process of claim 12, wherein the receiving the security object and at least one object attribute associated with the security object from a second key orchestration device comprises:

receiving, by the first key orchestration device from the second key orchestration device, a request to generate the security object; and generating, with a key source associated with the first enterprise, the security object in response to the request.

17. A non-transitory computer-readable medium comprising computer-readable instructions such that, when executed, causes a processor to:

define a plurality of policies in a database;

receive the security object for distributing to at least one communication device and at least one object attribute associated with the security object;

determine acceptability of the security object based, at least in part, on the at least one object attribute and at least one of the plurality of policies corresponding to the at least one object attribute; and distribute the same security object to the at least one communication device associated with the processor in response to the security object being determined to be acceptable, wherein the at least one communication device establishes communication based, at least in part, on the security object.

18. The non-transitory computer-readable medium of claim 17, wherein the security object is an encryption key.

19. The non-transitory computer-readable medium of claim 17, wherein the at least one object attribute comprises at least one of a security object size, time when the security object is generated, geo-location where the security object is generated, classification of the security object, role associated with a key source, role associated with a source device, and role associated with a target device.

20. The non-transitory computer-readable medium of claim 17, wherein the plurality of policies comprises accepting the security object when at least one of the security object size is within a predetermined size range, the time when the security object is generated is within a predetermined time interval, the geo-location where the security object is generated is within a predetermined area, the classification of the security object is included in a predetermined security object classification group, and the role associated with the key source, the source device, or the target device is associated with a predetermined group of roles.

21. The process of claim 1, wherein the at least one object attribute comprises cryptographic characteristics of the security object.

22. The process of claim 1, wherein the at least one object attribute comprises cryptographic algorithms of the security object.

* * * * *